(12) United States Patent
Inoue et al.

(10) Patent No.: US 11,752,853 B2
(45) Date of Patent: Sep. 12, 2023

(54) VEHICLE AND VEHICLE BASE STRUCTURE

(71) Applicants: TOYOTA JIDOSHA KABUSHIKI KAISHA, Toyota (JP); SUBARU CORPORATION, Tokyo (JP)

(72) Inventors: Shin Inoue, Okazaki (JP); Katsuya Oshima, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 72 days.

(21) Appl. No.: 17/500,467

(22) Filed: Oct. 13, 2021

(65) Prior Publication Data

US 2022/0118842 A1 Apr. 21, 2022

(30) Foreign Application Priority Data

Oct. 15, 2020 (JP) ................................. 2020-174155

(51) Int. Cl.
*B60K 1/04* (2019.01)

(52) U.S. Cl.
CPC ........ *B60K 1/04* (2013.01); *B60K 2001/0438* (2013.01)

(58) Field of Classification Search
CPC .............. B60K 1/04; B60K 2001/0348; B60Y 2306/01; B62D 25/20; B60R 13/08; H01M 50/244; H01M 50/249
See application file for complete search history.

(56) References Cited

U.S. PATENT DOCUMENTS

| | | | |
|---|---|---|---|
| 10,611,234 B1* | 4/2020 | Berels | H01M 10/656 |
| 2012/0301765 A1* | 11/2012 | Loo | H01M 50/224 |
| | | | 429/100 |
| 2014/0287290 A1* | 9/2014 | Haijima | B60K 1/04 |
| | | | 429/100 |
| 2019/0023321 A1 | 1/2019 | Ayukawa | |
| 2019/0047628 A1 | 2/2019 | Kawase | |
| 2019/0337402 A1* | 11/2019 | Günther | B60L 50/66 |

FOREIGN PATENT DOCUMENTS

| | | |
|---|---|---|
| JP | 2013-086641 A | 5/2013 |
| JP | 2019-018732 A | 2/2019 |
| JP | 2019-031219 A | 2/2019 |
| JP | 2019-106319 A | 6/2019 |
| JP | 2020-040610 A | 3/2020 |

\* cited by examiner

*Primary Examiner* — Jason D Shanske
*Assistant Examiner* — James J Triggs
(74) *Attorney, Agent, or Firm* — Dinsmore & Shohl LLP

(57) ABSTRACT

Included are a pair of rockers, a floor panel disposed between the rockers, a battery pack disposed beneath the floor panel, a bracket that connects the battery pack to the rockers, and an under cover that covers a lower face of the battery pack. The battery pack includes a tray, a first partitioning plate that is disposed upon the tray and that extends in a front-rear direction, and a plurality of battery cells disposed on both sides of the first partitioning plate upon the tray. The under cover has a first portion and a second portion disposed beneath the tray with a spacing as to the tray. The second portion is situated on an upper side from the first portion. The second portion is disposed beneath the first partitioning plate.

8 Claims, 6 Drawing Sheets

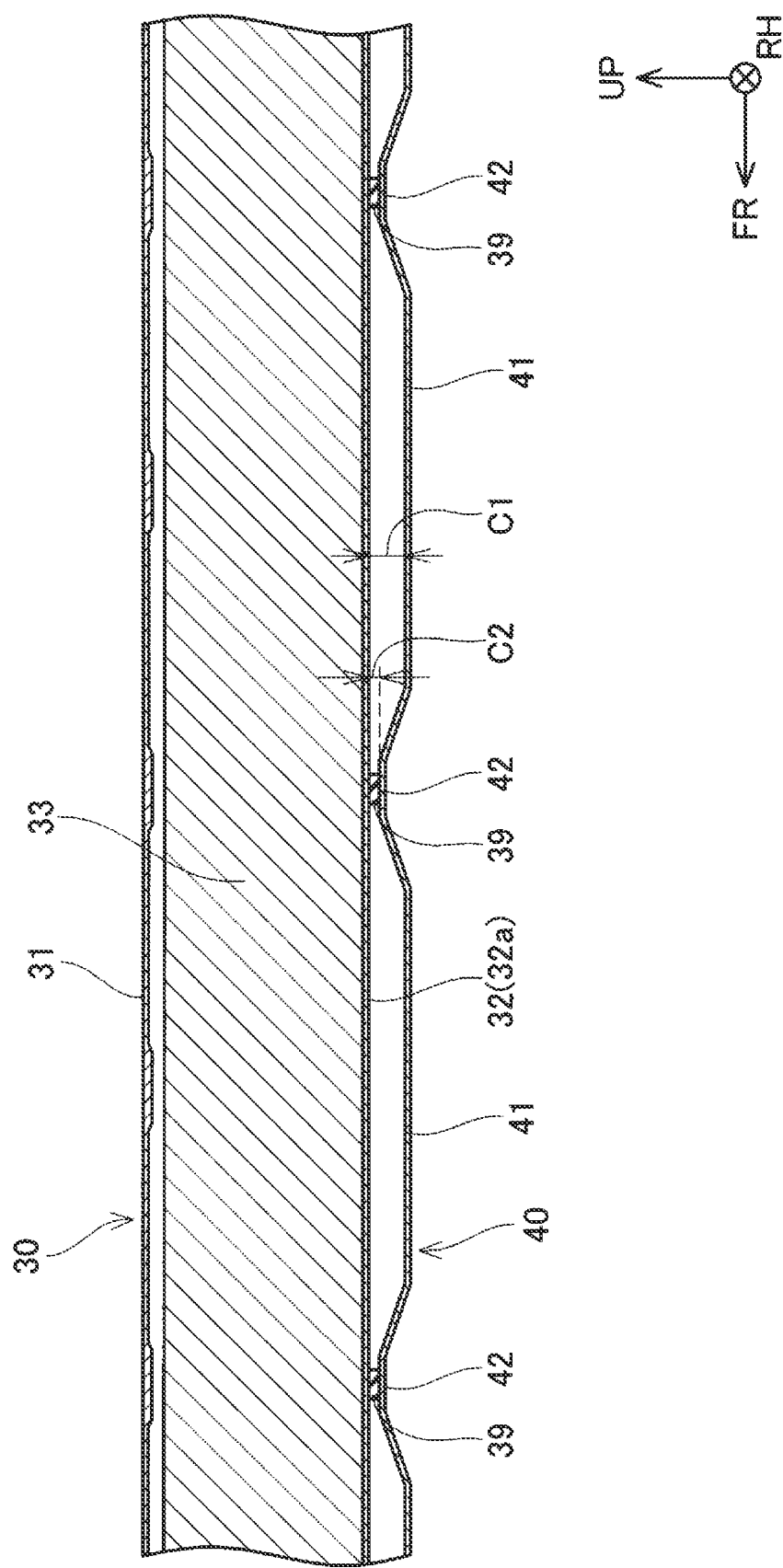

500
VEHICLE AND VEHICLE BASE STRUCTURE

CROSS-REFERENCE TO RELATED APPLICATION

This application claims priority to Japanese Patent Application No. 2020-174155 filed on Oct. 15, 2020, incorporated herein by reference in its entirety.

BACKGROUND

1. Technical Field

The technology disclosed in the present specification relates to a vehicle having a battery pack, and a vehicle base structure.

2. Description of Related Art

Japanese Unexamined Patent Application Publication No. 2019-031219 (JP 2019-031219 A) discloses a vehicle having a battery pack beneath a floor panel.

SUMMARY

In a vehicle that has a battery pack beneath a floor panel, the minimum ground clearance (the distance from the road surface to the lower face of the vehicle) tends to be small. Accordingly, objects on the road surface (e.g., rocks or the like) readily come into contact with the lower face of the battery pack. A vehicle and a vehicle base structure that suitably protect the battery pack by an under cover that covers the lower face of the battery pack are proposed in the present specification.

A vehicle according to a first aspect disclosed in the present specification includes a pair of rockers, a floor panel disposed between the rockers, a battery pack disposed beneath the floor panel, a bracket that connects the battery pack to the rockers, and an under cover that covers a lower face of the battery pack. The battery pack includes a tray, a first partitioning plate that is disposed upon the tray and that extends in a front-rear direction, and a plurality of battery cells disposed on both sides of the first partitioning plate upon the tray. The under cover has a first portion and a second portion disposed beneath the tray with a spacing as to the tray. The second portion is situated on an upper side from the first portion. The second portion is disposed beneath the first partitioning plate.

This vehicle has the under cover that covers the lower face of the battery pack (i.e., the lower face of the tray). The under cover suppresses an object on the road surface from directly colliding with the battery pack. The under cover has a first portion and a second portion disposed beneath the tray with a spacing as to the tray. When an object on the road surface collides with the first portion or the second portion, the under cover is deflected upward. The second portion is situated on the upper side from the first portion, and accordingly, when the under cover is deflected upwards, the second portion is supported by the tray before the first portion comes into contact with the tray. This suppresses the first portion from coming into contact with the tray. Thus, the load is suppressed from being transmitted from the first portion to the tray. Also, while load is transmitted from the second portion to the tray, the second portion is disposed beneath the first partitioning plate, and accordingly the first partitioning plate receives the load applied to the tray from the second portion. Thus, the load is suppressed from being applied to the battery cell upon the tray. In this way, the load can be effectively suppressed from being applied to the battery cell, according to the under cover of this vehicle.

A vehicle base structure according to a second aspect disclosed in the present specification includes a floor panel, a battery pack disposed beneath the floor panel, and an under cover that covers a lower face of the battery pack. The battery pack includes a tray, a first partitioning plate that is disposed upon the tray and that extends in a first direction, and a battery cell disposed adjacent to the first partitioning plate upon the tray. The under cover has a first portion and a second portion disposed beneath the tray with a spacing as to the tray. The second portion has a narrower spacing as to the tray than the first portion, and the second portion is disposed beneath the first partitioning plate.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a sectional corresponding to FIG. 4, of a modification of the vehicle.

DETAILED DESCRIPTION OF EMBODIMENTS

In a vehicle according to an example disclosed in the present specification, a spacing may be provided between a second portion and a tray.

According to this configuration, when an upward load is applied to an under cover, the second portion is supported by the tray by the second portion coming into contact with the tray.

In a vehicle according to an example disclosed in the present specification, an elastic member may be provided between the second portion and the tray.

According to this configuration, when an upward load is applied to the under cover, the second portion is supported by the tray via the elastic member.

Figure 1:
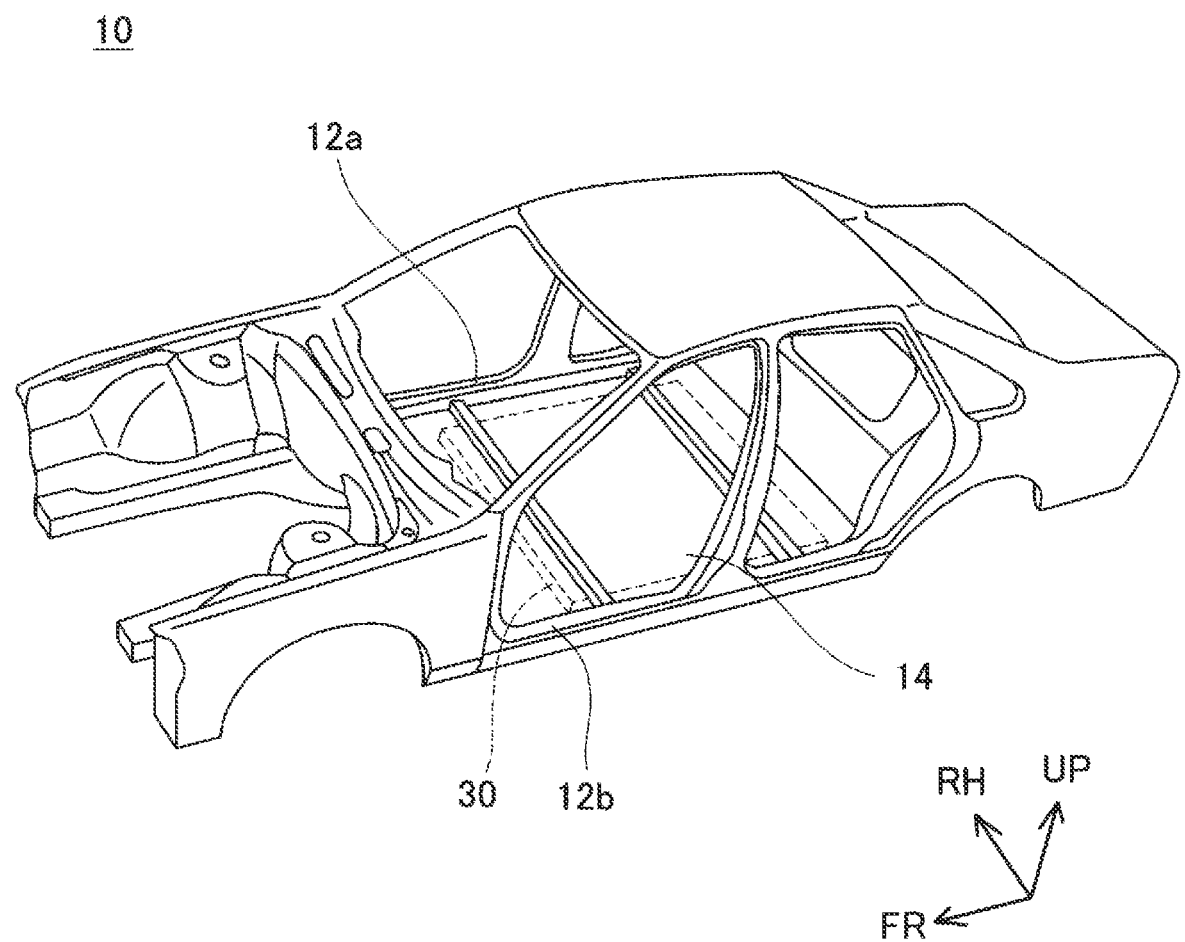
FIG. 1 is a perspective view of a vehicle according to an embodiment.

A vehicle 10 according to an embodiment illustrated in FIG. 1 has a floor panel 14 making up a floor of a cabin. Note that in the drawings including FIG. 1, the arrow FR indicates the vehicle front side, the arrow RH indicates the vehicle right side, and the arrow UP indicates the up side. Rockers 12 (a right rocker 12a and a left rocker 12b) that extend in the front-rear direction of the vehicle 10 are disposed on both the right and left sides of the floor panel 14. The floor panel 14 is disposed between the right rocker 12a and the left rocker 12b, and is joined to the right rocker 12a and the left rocker 12b. A battery pack 30 is disposed beneath the floor panel 14.

Figure 2:
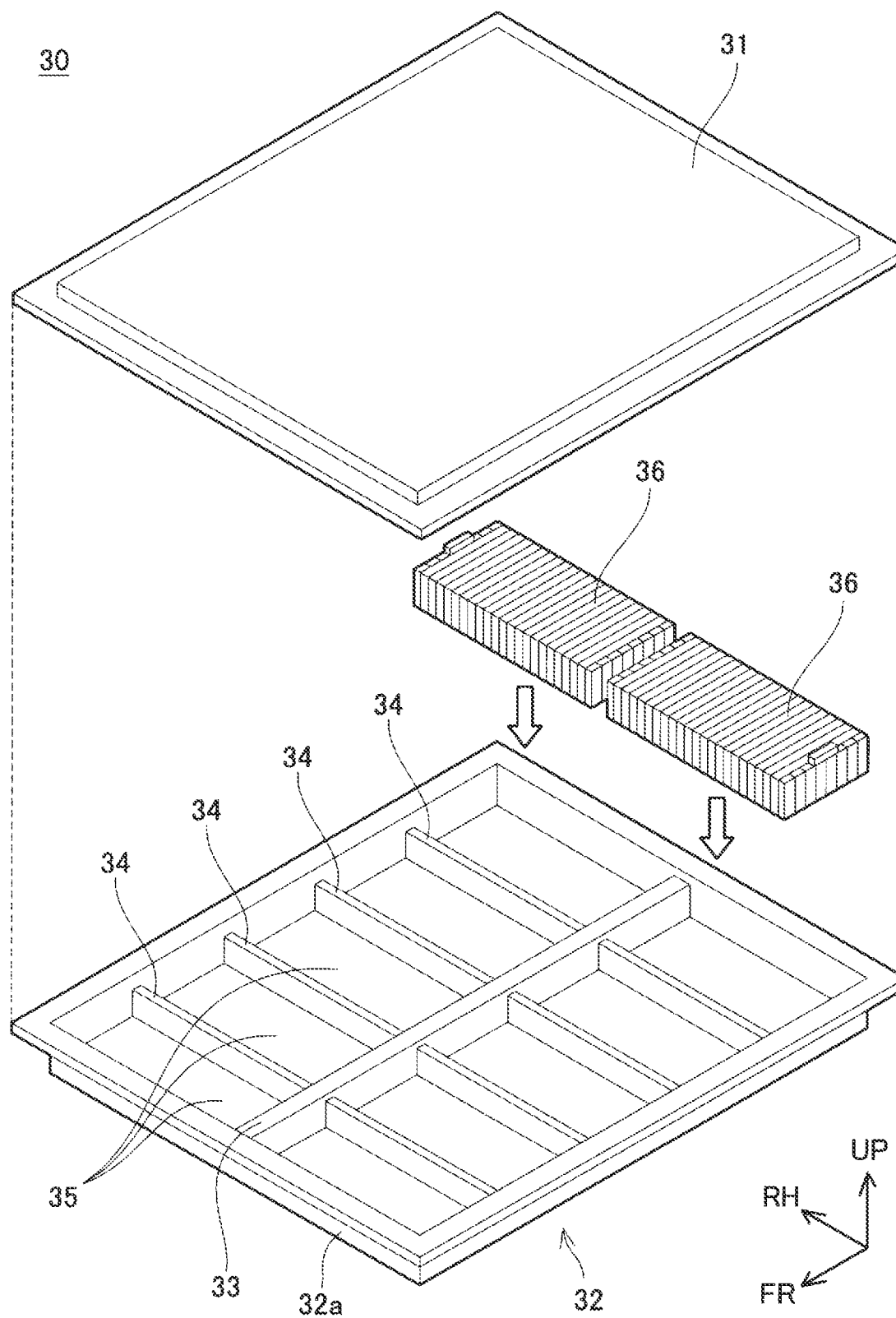
FIG. 2 is a disassembled perspective view of a battery pack.

The battery pack 30 has a tray 32 and a cover 31, as illustrated in FIG. 2. The cover 31 is disposed upon the tray 32. A partitioning plate 33 and a plurality of partitioning plates 34 are provided within the battery pack 30. The partitioning plate 33 is provided upon the tray 32, and extends in the front-rear direction. The partitioning plates 34 are provided upon the tray 32, and extend in the vehicle-width direction (right-left direction). The partitioning plates 34 are disposed with intervals therebetween in the front-rear direction. The partitioning plates 33 and 34 partition the space above the tray 32 into a plurality of regions 35. A battery stack 36 is accommodated in each of the regions 35. Note that FIG. 2 illustrates two battery stacks 36, and omits illustration of the remaining battery stacks 36. The battery stacks 36 are each a laminate in which a plurality of battery cells are laminated, and can store electric power. The battery stacks 36 are disposed on both sides (both the right and left sides) of the partitioning plate 33 extending in the front-rear direction. The battery stacks 36 are also disposed on both sides (both front and rear sides) of the partitioning plates 34 extending in the right-left direction. Further, a terminal block that supplies electric power of the battery stacks 36 to the outside is provided upon the tray 32, although omitted from illustration. The cover 31 is fixed to the tray 32 in a state of covering the plurality of battery stacks 36.

Figure 3:
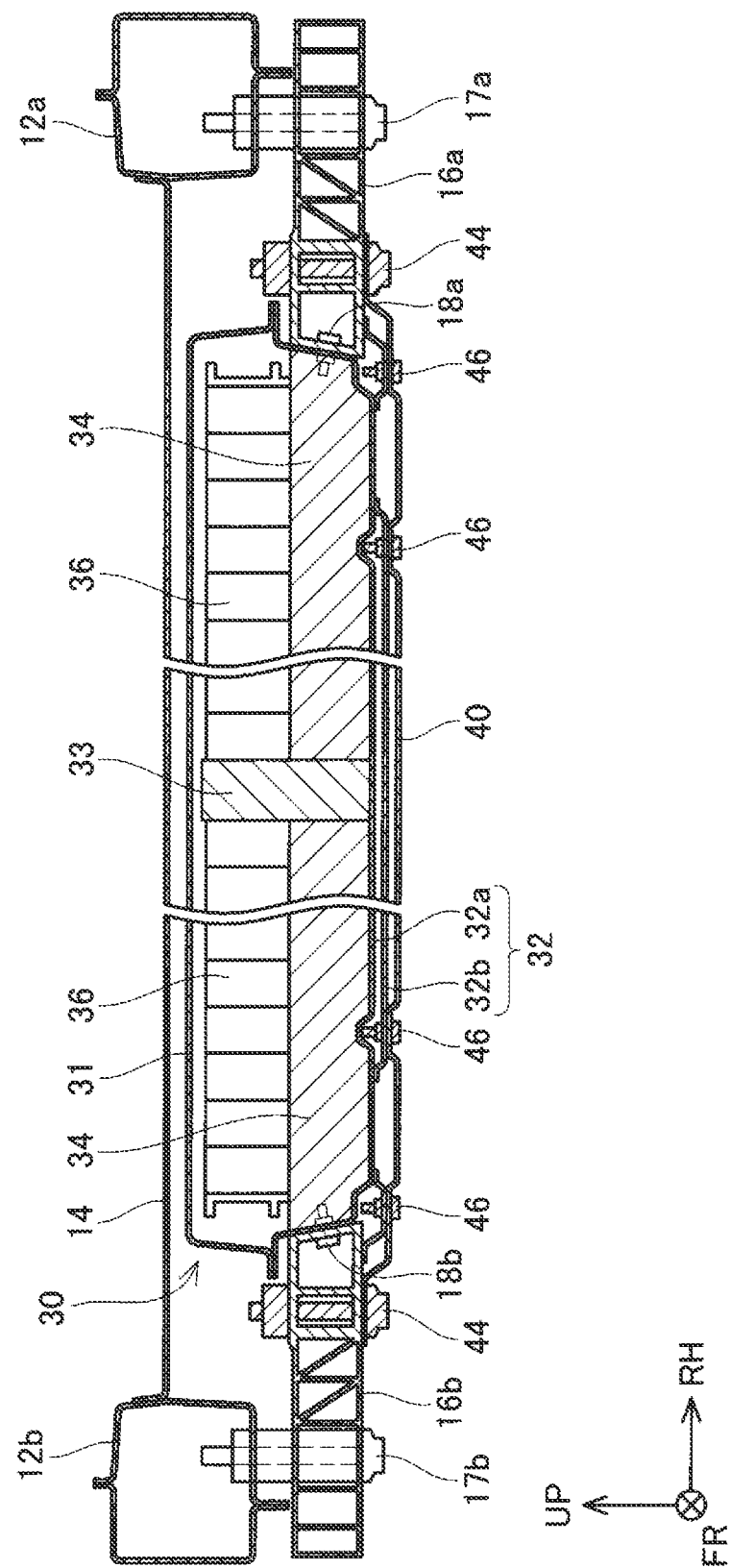
FIG. 3 is a cross-sectional view taken along a vehicle-width direction of the battery pack and peripheral members thereof.

FIG. 3 is a cross-sectional view of the battery pack 30 and peripheral members thereof, taking along one of the partitioning plates 34. The battery pack 30 is provided beneath the floor panel 14, as illustrated in FIG. 3. A right bracket 16a is provided to the right side of the battery pack 30. The right bracket 16a is connected to the right rocker 12a by bolts 17a. The right bracket 16a is also connected to the tray 32 of the battery pack 30 by bolts 18a. Accordingly, the battery pack 30 is connected to the right rocker 12a via the right bracket 16a. The right bracket 16a functions as an energy absorbing member that absorbs energy in the event of a collision of the vehicle 10. When there is a collision to the right side of the vehicle 10, the right bracket 16a deforms, whereby collision energy is absorbed, and the battery pack 30 is protected. A left bracket 16b is provided to the left side of the battery pack 30. The left bracket 16b is connected to the left rocker 12b by bolts 17b. The left bracket 16b is also connected to the tray 32 of the battery pack 30 by bolts 18b. Accordingly, the battery pack 30 is connected to the left rocker 12b via the left bracket 16b. The left bracket 16b functions as an energy absorbing member that absorbs energy in the event of a collision of the vehicle 10. When there is a collision to the left side of the vehicle 10, the left bracket 16b deforms, whereby collision energy is absorbed, and the battery pack 30 is protected.

The tray 32 has a tray main unit 32a and a tray bracket 32b, as illustrated in FIG. 3. The battery stacks 36 and the partitioning plates 33 and 34 are disposed upon the base plate of the tray main unit 32a. The tray bracket 32b is joined to the lower face of the tray main unit 32a. The tray bracket 32b is disposed beneath the partitioning plates 34. The tray bracket 32b is not provided at positions other than beneath the partitioning plates 34.

Figure 4:
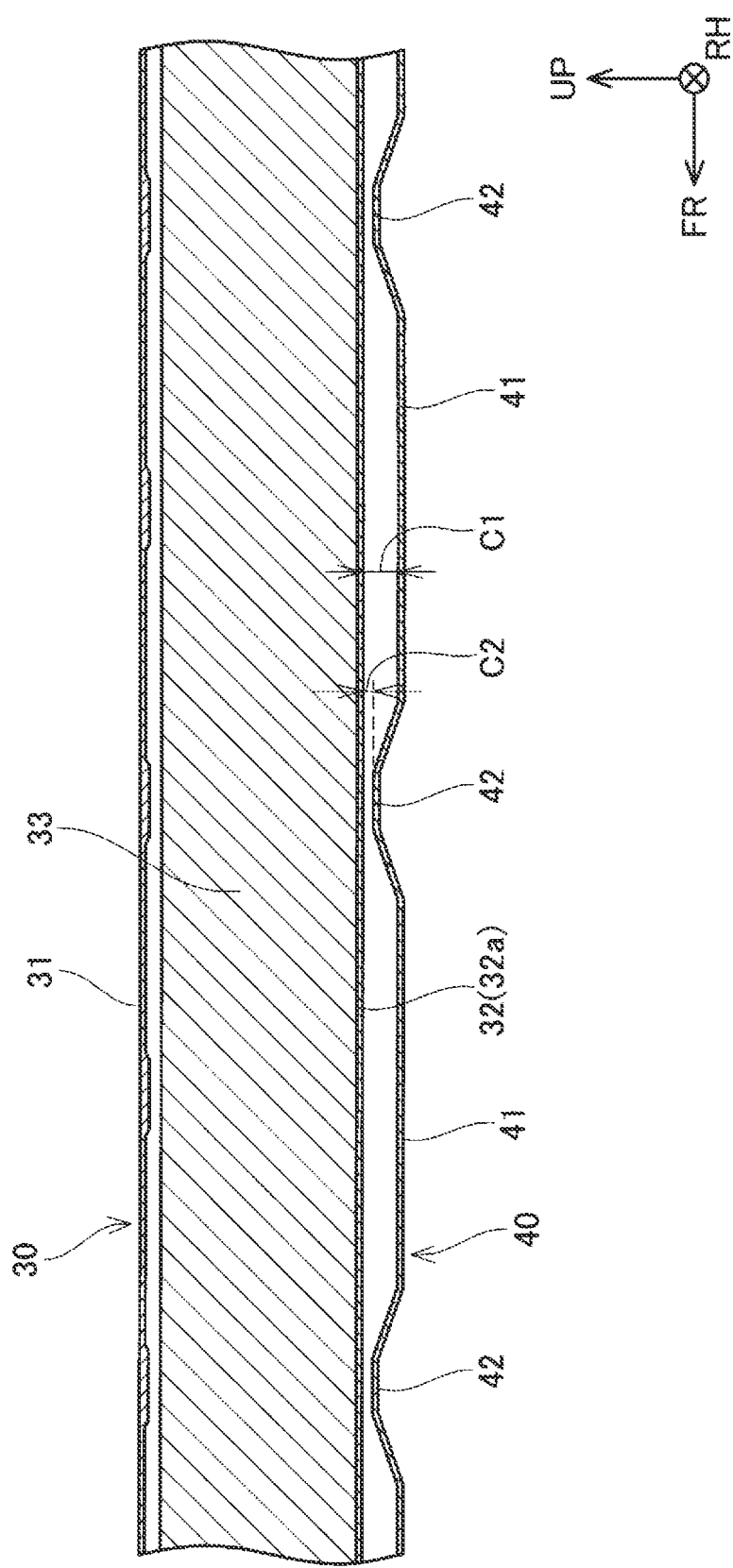
FIG. 4 is a sectional view taken along a front-rear direction of the battery pack and peripheral members thereof.

An under cover 40 is disposed beneath the tray 32, as illustrated in FIGS. 3 and 4. The under cover 40 is made of metal. The under cover 40 is provided to protect the battery pack 30 from objects on the road surface. As illustrated in FIG. 3, the under cover 40 is fastened to the tray bracket 32b by bolts 46, beneath the partitioning plates 34. Accordingly, the under cover 40 is fixed to the tray 32. The under cover 40 is fastened to the right bracket 16a and the left bracket 16b by bolts 44, as illustrated in FIG. 3. Spacings are provided between the under cover 40 and the tray 32 except for the positions where fastened by the bolts 46, as illustrated in FIGS. 3 and 4.

Figure 5:
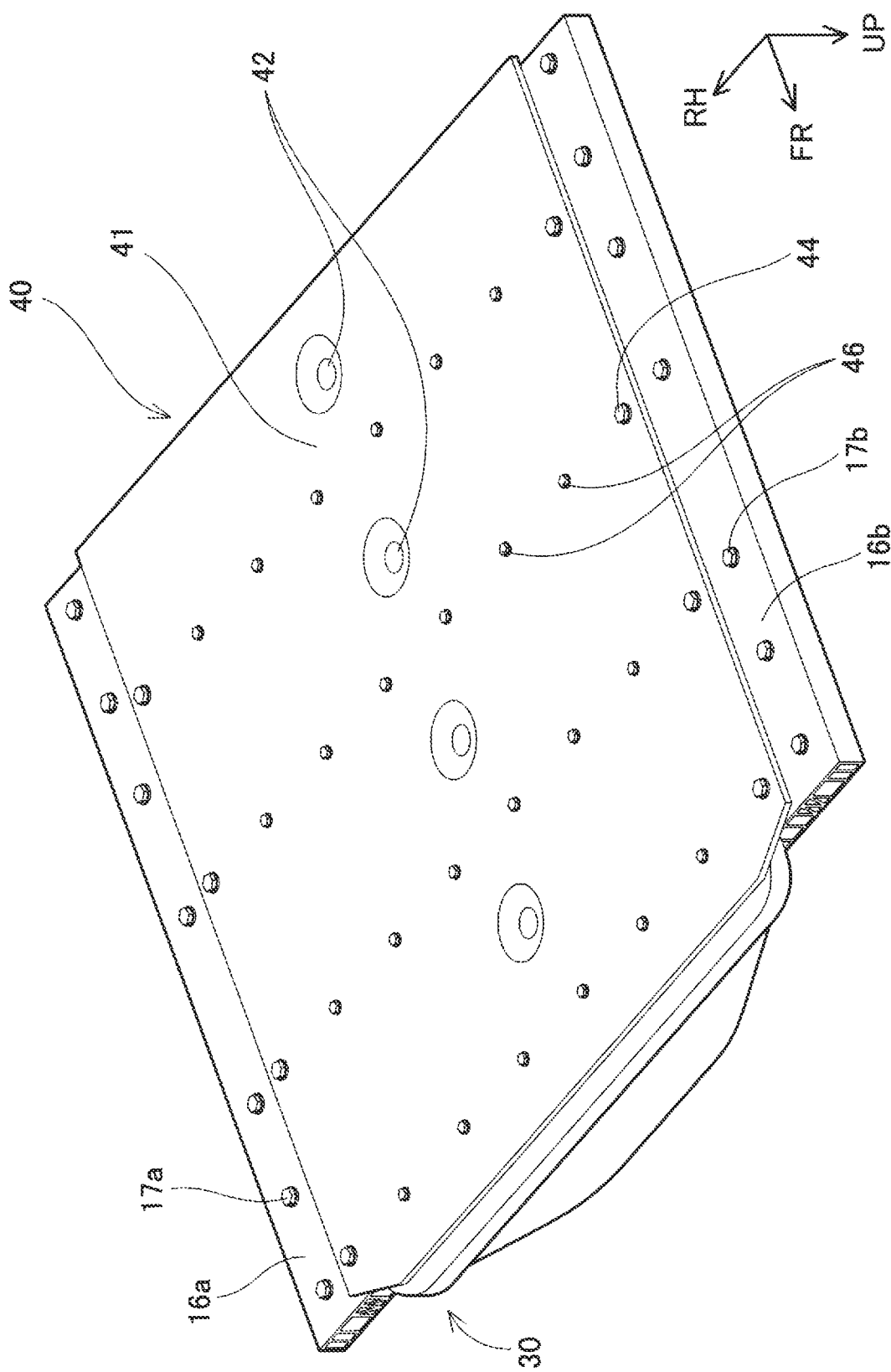
FIG. 5 is a perspective view illustrating a lower face of an under cover.

The under cover 40 has a first portion 41 and second portions 42, as illustrated in FIG. 4. The first portion 41 extends substantially level. The second portions 42 are situated upward from the first portion 41 (i.e., at the tray 32 side). Due to the second portions 42 being situated upward from the first portion 41 in this way, a spacing C2 between the second portions 42 and the tray 32 is narrower than a spacing C1 between the first portion 41 and the tray 32. Due to the second portions 42 being situated upward from the first portion 41, recessed portions are formed on the lower face of the under cover 40 at the positions of the second portions 42. The greater part of the under cover 40 is made up of the first portion 41, as illustrated in FIG. 5. The second portions 42 are each disposed at the middle of the under cover 40 in the vehicle-width direction. The plurality of second portions 42 are arrayed in the front-rear direction of the vehicle 10 following a center line of the under cover 40, with intervals therebetween. The second portions 42 are disposed beneath the partitioning plate 33, as illustrated in FIG. 4. The spacing C2 between the second portions 42 and the tray 32 is set to be small to the extent that when the under cover 40 exhibits upward deflection within an elastically deformable range, the second portions 42 come into contact with the tray 32. As illustrated in FIG. 5, the second portions 42 are provided at positions away from the bolts 46.

There are cases in which objects on the road surface (e.g., rocks or the like) come into contact with the vehicle body while the vehicle 10 is traveling. The lower face of the battery pack 30 is covered by the under cover 40 in the vehicle 10, and accordingly objects on the road surface come into contact with the under cover 40. Thus, the objects are suppressed from coming into contact with the battery pack 30. As described above, spacing is provided between the under cover 40 and the tray 32 except for portions where the bolts 46 are provided. Accordingly, when an upward load is applied to the under cover 40 by contact with an object, the under cover 40 is deflected upwards. The spacing C2 between the second portions 42 and the tray 32 is narrower than the spacing C1 between the first portion 41 and the tray 32, as described above. Also, the second portions 42 are provided at positions away from the bolts 46, as illustrated in FIG. 5, and accordingly the second portions 42 readily move upwards when the under cover 40 is deflected upwards. Accordingly, when the under cover 40 is deflected upwards under the load, the second portions 42 come into contact with the lower face of the tray 32. As a result, the second portions 42 are supported by the tray 32, and deformation of the under cover 40 is suppressed. Accordingly, the first portion 41 is suppressed from coming into contact with the tray 32 even when the under cover 40 is deflected upward. Also, the second portions 42 are disposed beneath the partitioning plate 33 of the tray 32. Accordingly, when the under cover 40 is deflected upward, the second portions 42 come into contact with the tray 32 at the position beneath the partitioning plate 33. Accordingly, the load applied from the second portions 42 to the tray 32 is received by the partitioning plate 33 that is highly durable. Thus, load can be suppressed from being applied from the under cover 40 to the battery stack 36 (i.e., battery cells). Accordingly, in the vehicle 10, when the under cover 40 is deflected upward, the under cover 40 (i.e., the first portion 41) can be suppressed from coming into contact with the tray 32 at positions beneath the battery stack 36. Thus, the load applied to the battery stack 36 can be reduced, and the battery pack 30 can be suitably protected.

While spacing (space) is provided between the second portions 42 and the tray 32 in the present embodiment described above, elastic members 39 may be interposed between the second portions 42 and the tray 32, as illustrated in FIG. 6. This configuration supports the second portions 42 by the tray 32 as well, via the elastic members 39, and accordingly deflection of the under cover 40 can be suppressed. In yet another example, a spacing C2 may be provided at the elastic members 39, so that the elastic members 39 are in contact with only one of the second portions 42 and the tray 32.

With regard to the vehicle according to the first aspect disclosed in the present specification, a spacing may be provided between the second portion and the tray.

With regard to the vehicle according to the first aspect disclosed in the present specification, an elastic member may be provided between the second portion and the tray.

With regard to the vehicle according to the first aspect disclosed in the present specification, a second partitioning plate that extends in a right-left direction may be disposed upon the tray. A tray bracket may be joined to below the tray beneath the second partitioning plate. The tray bracket and the under cover may be fastened by a bolt. The second portion is provided at a position away from the bolt.

With regard to the vehicle according to the first aspect disclosed in the present specification, a plurality of the second partitioning plates may be disposed arrayed in the front-rear direction of the vehicle. The second portion may be provided between the second partitioning plates.

With regard to the vehicle base structure according to the second aspect disclosed in the present specification, a second partitioning plate that extends in a second direction that is different from the first direction may be disposed upon the tray. A tray bracket may be joined to below the tray beneath the second partitioning plate. The tray bracket and the under cover are fastened by a bolt. The second portion is provided at a position away from the bolt.

With regard to the vehicle base structure according to the second aspect disclosed in the present specification, a plurality of the second partitioning plates may be disposed arrayed in the first direction. The second portion is provided between the second partitioning plates.

With regard to the vehicle base structure according to the second aspect disclosed in the present specification, an elastic member may be provided between the second portion and the tray.

With regard to the vehicle base structure according to the second aspect disclosed in the present specification, the battery cell may be disposed on both ends of the first partitioning plate.

What is claimed is:

1. A vehicle, comprising:
a pair of rockers;
a floor panel disposed between the rockers;
a battery pack disposed beneath the floor panel;
a bracket that connects the battery pack to the rockers; and
an under cover that covers a lower face of the battery pack, wherein:
the battery pack includes
a tray,
a first partitioning plate that is disposed upon the tray and that extends in a front-rear direction,
a plurality of battery cells disposed on both sides of the first partitioning plate upon the tray,
a second partitioning plate that is disposed upon the tray and that extends in a right-left direction, and
a tray bracket joined to below the tray beneath the second partitioning plate;
the under cover has a first portion and a second portion disposed beneath the tray and spaced apart from the tray;
the tray bracket and the under cover are fastened by a bolt;
the second portion is situated on an upper side from the first portion;
the second portion is disposed beneath the first partitioning plate; and
the second portion is provided at a position away from the bolt.

2. The vehicle according to claim 1, wherein a spacing is provided between the second portion and the tray.

3. The vehicle according to claim 1, wherein an elastic member is provided between the second portion and the tray.

4. The vehicle according to claim 1, wherein
a plurality of the second partitioning plates is spaced apart and arranged in the front-rear direction of the vehicle; and
the second portion is provided between the second partitioning plates.

5. A vehicle base structure, comprising:
a floor panel;
a battery pack disposed beneath the floor panel; and
an under cover that covers a lower face of the battery pack, wherein:
the battery pack includes
a tray,
a first partitioning plate that is disposed upon the tray and that extends in a first direction, and
a battery cell disposed adjacent to the first partitioning plate upon the tray,
a second partitioning plate that is disposed upon the tray and that extends in a second direction that is different from the first direction, and
a tray bracket is joined to below the tray beneath the second partitioning plate;
the under cover has a first portion and a second portion disposed beneath the tray and spaced apart from the tray;
the tray bracket and the under cover are fastened by a bolt;
the second portion is spaced apart from the tray by a first distance which is less than a second distance between the first portion and the tray;
the second portion is disposed beneath the first partitioning plate; and
the second portion is provided at a position away from the bolt.

6. The vehicle base structure according to claim 5, wherein:
a plurality of the second partitioning plates is spaced apart and arranged in the first direction; and
the second portion is provided between the second partitioning plates.

7. The vehicle base structure according to claim 5, wherein an elastic member is provided between the second portion and the tray.

8. The vehicle base structure according to claim 5, wherein the battery cell is disposed on both ends of the first partitioning plate.

* * * * *